United States Patent [19]
Baron et al.

[11] Patent Number: 5,122,420
[45] Date of Patent: Jun. 16, 1992

[54] COMPONENTS MADE FROM CONTINUOUS FIBER REINFORCED POLYAMIDE MOLDING COMPOSITIONS AND RUBBER, AND A PROCESS FOR THEIR PREPARATION

[75] Inventors: Christian Baron; Thomas Grosse-Puppendahl, both of Haltern; Hans Jadamus; Klaus-Peter Richter, both of Marl, all of Fed. Rep. of Germany

[73] Assignee: Hüls Aktiengesellschaft, Marl, Fed. Rep. of Germany

[21] Appl. No.: 573,827

[22] Filed: Aug. 28, 1990

[30] Foreign Application Priority Data
Oct. 12, 1989 [DE] Fed. Rep. of Germany ....... 3934091

[51] Int. Cl.⁵ ................ B32B 27/08; B32B 25/08; B05D 3/02
[52] U.S. Cl. .................. 428/474.4; 427/385.5; 427/393.5; 428/492; 428/521; 428/522
[58] Field of Search ............ 428/357, 474.4, 492, 428/521, 522; 525/105, 285, 133; 427/385.5, 393.5

[56] References Cited

U.S. PATENT DOCUMENTS

| | | | |
|---|---|---|---|
| 3,518,278 | 6/1970 | Suh | 546/80 |
| 4,010,223 | 3/1977 | Caywood, Jr. | 525/285 |
| 4,339,376 | 7/1982 | Kasahara et al. | 525/133 |
| 4,844,944 | 2/1989 | Graefe et al. | 428/357 |
| 5,006,603 | 4/1991 | Takaki et al. | 525/105 |

*Primary Examiner*—Thomas J. Herbert, Jr.
*Attorney, Agent, or Firm*—Oblon, Spivak, McClelland, Maier & Neustadt

[57] ABSTRACT

Components made from at least two molded materials A and B which are firmly bonded together, and in which a) the molded material A is composed of a matrix of polyamide or of a polyamide-containing molding composition and of a continuous, fibrous reinforcement embedded therein, and b) the molded material B is the rubber obtained after peroxidic vulcanization of a rubber composition which is applied to A, the rubber composition containing the following components:

i) about 100 parts by weight of a rubber having carboxyl or anhydride functional groups;
ii) about 10 to 300 parts by weight of fillers; and
iii) about 1 to 10 parts by weight of peroxidic vulcanizing agents.

13 Claims, No Drawings

COMPONENTS MADE FROM CONTINUOUS FIBER REINFORCED POLYAMIDE MOLDING COMPOSITIONS AND RUBBER, AND A PROCESS FOR THEIR PREPARATION

BACKGROUND OF THE INVENTION

1. Field of the Invention

The present invention relates to components which are composed of at least one continuous fiber reinforced thermoplastic polyamide component and one rubber component, which are bonded together without the use of coupling agents or adhesives.

2. Description of the Background

A single material cannot always provide all of the properties which are required of an object. Some property combinations are irreconcilable, such as for example, high strength, rigidity or hardness on the one hand and good vibration-damping, high elasticity and non-skid properties on the other hand. If a component is to combine these properties, composites of a plurality of materials are used.

In principle, it might be thought that composites having the above combined properties could be prepared from metal and rubber. However, this combination of materials has significant disadvantages:

1. Metals have a high density, i.e., the components produced from them are heavy.
2. Without a coupling agent, a primer or an adhesive it is not possible to bond metal and rubber.
3. It is very costly to prepare complex components such as, for example, three-dimensional structures from metal.

Continuous-fiber-reinforced thermoplastics are, for example, described in R. F. McMahon "Developments in Reinforced Plastics-4", Elsevier Applied Science Publishers, 1984, and also in G. Brandt and H. Richter, Kunststoffe 77 (1987), P. 40. The systems described in these articles would satisfy the above-mentioned strength, rigidity and hardness requirements; however, examination shows that the reinforced plastics which have been described do not form a firm bond with rubber. The vulcanized rubber can be peeled from the interface with the thermoplastic by a small force, i.e., of less than 0.7 N/mm, in the case of a carbon fiber/polyether ether ketone/E-SBR rubber composite. Such a low level of adhesion is quite unsatisfactory for industrial purposes.

DE-A-3,615,965 discloses the preparation of a firm bond between continuous-fiber-reinforced polyphenylene ether molding compositions and certain rubbers containing double bonds, such as, for example, styrene-butadiene rubber. The adhesions achieved by this method are considerable, but the solvent resistance and also the weathering resistance of the polyphenylene ether molding compositions which are used are unsatisfactory. Hence, the conventional methods cannot therefore provide a simple preparation of components which is composed on the one hand of continuous-fiber-reinforced thermoplastics and on the other hand of rubber, and which additionally has good solvent and weathering resistance.

Further, EP-A-0,344,427 discloses a process for the preparation of a chemical bond between molding compositions based on aliphatic polyamides on the one hand and carboxyl-containing rubbers on the other hand, as well as materials prepared by the process. However, there is no indication therein that non-metallic fibers can be used.

Thus, a need clearly continues to exist for a simple preparation of components which are composed of at least one continuous fiber reinforced thermoplastic and a rubber component, and which has, at once, excellent solvent and weathering resistance.

SUMMARY OF THE INVENTION

Accordingly, it is an object of the present invention to provide a simple preparation of components which are composed of at least one continuous fiber reinforced thermoplastic and a rubber component which has, at once, excellent solvent and weathering resistance.

It is also an object of this invention to provide a process for preparing the components described above.

The above objects and others which will be described hereinbelow are provided by components made from at least two molded materials A and B which are firmly bonded together, wherein:

a) the molded material A is composed of a matrix of polyamide (PA) or of a polyamide-containing (PA-containing) molding composition and of a continuous, fibrous reinforcement embedded therein, and b) the molded material B is the rubber obtained after peroxidic vulcanization of a rubber composition which has been applied to A, the rubber composition containing the following components:

i) about 100 parts by weight of a rubber having carboxyl or anhydride functional groups;
ii) about 10 to 300 parts by weight of fillers; and
iii) about 1 to 10 parts by weight of peroxidic vulcanizing agents.

DETAILED DESCRIPTION OF THE PREFERRED EMBODIMENTS

The fibrous reinforcement of the molding compositions based on PA are composed of continuous non-metallic fibers such as, for example, carbon fibers, aramid fibers and/or glass fibers. The fibers may, for example, be present in the form of yarns, fabrics, mats, webs, UD tapes, laid fabrics, rovings or as individual fibers. Normally, the fibers are treated with a size by the producer. The rigidity and strength of the continuous-fiber-reinforced PA molding compositions are accordingly determined by the type, alignment and proportion of the fibrous reinforcements and by the composition of the matrix.

The polyamides used according to the invention have —CO—NH— bonds in their main chain. Any polyamides which can be melted by heating are suitable. Particular examples of suitable polyamides are PA 46, PA 6, PA 66, PA 610, PA 612, PA 1010, PA 1012, PA 11, PA 12 and/or PA 1212. The polyamides are prepared by polycondensation in a known manner. The ratio of COOH groups to $NH_2$ groups in the polyamide is preferably 1: x where $100 > x > 1$.

The molding compositions based on PA may, for example, contain polyphenylene ethers. Suitable polyamide/polyphenylene ether molding compositions are prepared by melting and mixing at least 30 percent by weight of a polyamide with up to 70 percent by weight of a polyphenylene ether. Molding compositions based on polyamides and polyphenylene ethers are described, for example, in DE-A-3,027,104 and 3,518,278 and also in EP-A-0,147,874 and EP-B-0,024,120. It is known to those skilled in the art that these molding compositions normally contain a compatibilizer.

Furthermore, the molding compositions optionally contain further additives such as, for example, stabilizers, processing auxiliaries, carbon black, graphite, titanium dioxide, zinc sulphide, pigments, impact modifiers and flame retardants. The proportion of these additives is preferably below 30%, relative to the total molding composition.

The rubber composition used to prepare the rubber component B contains an unvulcanized rubber having carboxyl or anhydride groups which is prepared, for example, in a known manner by carboxylation using unsaturated acids or acid derivatives such as, for example, maleic acid or maleic anhydride (cf., for example, U.S. Pat. No. 4,010,223). It is also possible to prepare these unvulcanized rubbers by copolymerization with unsaturated acids, such as, for example, acrylic acid. In principle, any unvulcanized rubbers containing carboxyl or anhydride groups, which can be prepared in a known manner are suitable. However, preference is given to carboxyl- or anhydride-containing EP(D)M rubbers and NBR rubbers.

EP(D)M rubbers are rubbers which are prepared in a known manner by polymerization of a mixture of ethylene and propylene and optionally a diene in the presence of a Ziegler-Natta catalyst.

The EPDM rubber is prepared, for example, by polymerizing a mixture of more than 25% of ethylene, more than 25% of propylene and 1 to 10%, in particular 1 to 3%, of a non-conjugated diene such as (2.2.1)-bicycloheptadiene, 1,4-hexadiene, dicyclopentadiene and, in particular, 5-ethylidenenorbornene.

Suitable EPM rubbers are produced, for example, by the EXXON company under the trade name EXXELOR VA 1803 (trade mark applied for). An example of a suitable EPDM rubber is maleic anhydride-modified BUNA ® AP (product designation: experimental product X 4496) from Bunawerke Hüls GmbH, D-4370 Marl.

Nitrile rubbers (NBR) are prepared by copolymerizing 50 to 80% by weight of butadiene and correspondingly 50 to 20% by weight of acrylonitrile. Carboxyl-containing nitrile rubbers are an example of particular modifications which may be used. In particular, they are copolymers of butadiene, acrylonitrile and acrylic acid, methacrylic acid or sorbic acid.

Suitable NBR rubbers are produced, for example, by Goodyear Tire & Rubber Company, Akron, Oh., USA, under the trade name CHEMIGUM ® NX 775 and by BF Goodrich, NV, Arnhem, Netherlands, under the trade name HYCAR ® 1472.

Suitable fillers are any such materials which are normally added to EP(D)M and NBR rubbers, such as, for example, carbon black, silica, silicates, calcium carbonate, zinc oxide and/or stearic acid.

The rubber composition can contain up to 150 parts by weight of plasticizer per 100 parts by weight of rubber. Examples of suitable plasticizers are naphthenic oils or synthetic plasticizers such as esters or ethers, preferably in an amount of up to 50 parts by weight, relative to 100 parts by weight of rubber.

Suitable peroxidic vulcanizing agents are the peroxides which are known to those skilled in the art, such as, for example, 2,5-dimethyl-2,5-bis(tert-butyl-peroxy)-hexane, dicumyl peroxide, 4,4-di-tert-butylperoxy-n-butyl valerate, 1,1-di-tert-butylperoxy-3,3,5-trimethylcyclohexane and bis (tert-butylperoxyisopropyl) benzene. Details of the use of peroxidic vulcanizing agents are given in the commercial literature "Rubbery Chemical-Crosslinking Peroxides" from Akzo-Chemie (publication date: April 1985).

Examples of suitable vulcanization activators are triallyl cyanurate (TAC) and acrylates such as ethylene glycol dimethacrylate (EDMA) and trimethylolpropane trimethacrylate (TRIM). Preference is given to the use of TAC and/or EDMA.

The vulcanizates have high tensile strength, good elasticity and very good abrasion resistance. The oil and solvent resistance typical of nitrile rubbers is unimpaired by the addition of unsaturated acid derivatives during polymerization.

The shape and dimensions of the molded materials which have been bonded in the component may differ greatly. They may, for example, be virtually identical as, for example, in sandwich structures, or different, as for example in large-area rubber mats having reinforced edges or in large-area rigid articles having vulcanized rubber feet.

The components according to the invention are essentially prepared in two steps. First, the continuous-fiber-reinforced polyamide molded material A is prepared and then the component B is prepared by vulcanizing the rubber composition which has been applied to A.

The thermoplastic molding composition can be applied to the reinforcement by various methods. A number of appropriate industrial processes are given below:

I. In a first step, the fibrous reinforcements are impregnated with a solution of the thermoplastic. Suitable solvents are any which can dissolve polyamides, an example being m-cresol. Then the solvent is removed. Simultaneously or subsequently, the molded material A is given its shape. This is advantageously carried out at elevated temperature and optionally with the application of a vacuum or an excess pressure. This method can be used to impregnate not only rovings but also fabrics and UD tapes, for example.

II. The fibrous reinforcements such as, for example, fabrics and UD tapes, are stacked alternately with thin PA sheets and then formed into the molded material A by the action of pressure and temperature in a press or an autoclave.

III. The fibrous reinforcement is coated directly with a PA powder by sprinkling it on. Then the fabric, with the powder loosely adhering to it, is passed through a heating zone, preferably on infrared oven, where the polymer melts and "sticks" to the fibers. The finished prepreg is cooled by passing it through a calender and can then be shaped as desired, for example, in a press by the action of pressure and temperature.

IV. If the reinforcement is rovings, the molded material A may also be prepared by a process which includes the following steps:
  1. First, the fiber roving is spread out and wetted with the polymer powder in a fluidized bed.
  2. Then the wetted fiber roving is coated with an extruded film of the same material.
  3. These rovings can then be further processed to form fabrics or UD prepregs which give the molded material A, for example, in a press under the action of pressure and temperature.

It is important in every case that in these processes the fibrous reinforcement is completely enclosed with polyamide or with the polyamide-containing molding composition.

The components consisting of rigid and rubber-elastic molded materials can be produced by various methods:

1. By applying the rubber composition to the molded material A and pressing under vulcanizing conditions.
2. By extrusion coating of pretreated rovings or of previously prepared rigid moldings with rubber followed by vulcanization.
3. By injection molding rubber around previously prepared rigid components followed by vulcanization in the same tool.

The optimal vulcanizing conditions are dependent on the rubber mixture which has been selected, particularly on its vulcanizing system, and also on the shape of the molding. Suitable vulcanizing temperatures are between 140° C. and 200° C., preferably between 150° C. and 180° C. When using PA materials having low dimensional stabilities at elevated temperature, vulcanizing temperatures at the lower end of the given ranges are selected.

The vulcanizing times are normally between 3 and 30 minutes, preferably between 5 and 15 minutes.

The components according to the invention can be used in many different ways. If the alignment of the reinforcements is unidirectional, the components are particularly suitable for peripheral protective elements for vehicles, such as rubbing strips, door trims or door sill liners. Another field of application is, for example, conveyor belts, in which the surfaces may be reinforced in the normal manner using carcasses.

Fields of application in which reinforcements are aligned orthotropically or quasi-isotropically, include non-skid panels and also doors and flaps with sealing lips.

Multiple sandwich structures made from thin layers of PA-coated reinforcements and optionally from reinforced rubber, the reinforcements preferably having a quasi-isotropic alignment, are used for ballistic applications (armor-plating).

Having described the present invention, the same will now be further illustrated by reference to certain examples which are offered solely for purposes of illustration and are not intended to be limitative.

EXAMPLE 1

Preparation and properties of a composite panel made from a glass fabric/PA composite and an EPM rubber having functional groups

Starting materials and preparation

1.1 Glass fabric

Commercially available textile fabric W 2415 having a basis weight of 170 g/m² from Verseidag Industrietextilien GmbH, D-4150 Krefeld.

1.2 Polyamide

Commercially available PA 12 powder from Huls AG, D-4370 Marl, with the trade name VESTOSINT ® X7004, having a particle size <45 μm. The properties of the VESTOSINT ® grades are summarized in the product data sheet "VESTOSINT BESCHICHTUNGSPULVER" 4151/4, published July 1988.

1.3 Pretreatment of the glass fabric

The polyamide 12 powder is sprinkled uniformly over the glass textile fabric. The fabric which has been coated in this manner is then passed into an infrared oven heated to 220° C. where the powder melts, penetrates the fabric, and sticks to the fibers. The finished prepreg is cooled by being passed through a calender and wound up. The ration of glass fiber to polyamide is determined by reweighing.

1.4 Panels made from a glass fabric/PA composite

The previously prepared PA prepregs are stacked in accordance with the desired panel thickness and pressed at 220° C. and 25 bar, using a spacer frame, to form panels.

| Ratio by volume of glass fabric to polyamide matrix | Properties of panels (2 mm in thickness) | | |
|---|---|---|---|
| | Modulus of elasticity in tension in MPa (DIN 53 457) | Tensile strength in MPa (DIN 53 455) | Elongation at break in % (DIN 53 455) |
| 27:73 | 6,800 | 240 | 4.4 |

1.5 Rubber: EXXELOR VA 1803

This is a maleic anhydride-modified EPM rubber from Exxon Chemicals, Wilmington, Del., USA. The properties of the product can be obtained from the technical data sheet "EXXELOR VA" published Mar. 1, 1988.

A carbon-black-filled EPM rubber containing plasticizer is prepared on a mill at 60° C. by mixing the following ingredients:

| Parts by weight | Material |
|---|---|
| 100 | EXXELOR VA 1803 |
| 5 | Zinc oxide |
| 60 | Paraffin oil "SUNPAR 150" (Producer: Sunoil, Belgium LV, Antwerp) |
| 100 | DUREX O, a semi-reinforcing gas black from Degussa, D-6450 Hanau |
| 1.5 | VULKANOX ®HS, an antioxidant from Bayer AG, D-5090 Leverkusen (2,2,4-Trimethyl-1,2-dihydroquinoline) |
| 1.0 | Triallyl cyanurate (TAC) from Degussa, D-6450 Hanau |
| 7.5 | PERKADOX ® 14/40 from Akzo-Chemie, Netherlands (peroxide) |

Composite panels with rubber

To demonstrate the bonding action, composite panels are prepared by covering the panels produced in 1.4 to the extent of one-third with a Teflon film, placing a rubber hide of suitable dimensions on the panel, preparing the composite by pressing and finally sawing off test pieces having a width of 25 mm. These test pieces are subjected to a peel test in accordance with DIN 53 539.

Result

The following properties are determined from Example 1:

| Unvulcanized rubber | Vulcanizing temperature in °C. | Vulcanizing time in min | Bond strength in N/mm DIN 53 539 | Type of separation c = cohesive a = adhesive |
| --- | --- | --- | --- | --- |
| 1.5 | 170 | 15 | 8.8 | c |

The separation in the peel test (DIN 53 539) occurs cohesively, i.e. the composite separates within the rubber component and not at the plastic/rubber interface.

EXAMPLE 2

The selection of starting materials and the preparation of the PA/glass fabric composite panels are as described under 1.1 to 1.4 in Example 1.

2.5 Unvulcanized rubber: CHEMIGUM ® NX 775

This is a carboxyl-containing NBR rubber from Goodyear Tire & Rubber, Akron, Oh., USA. The properties of the product can be obtained from the product data sheet "CHEMIGUM NX 775", published November 1987. An NBR rubber containing filler and plasticizer is prepared on a mill at 60° C. by mixing the following ingredients:

| Parts by weight | Material |
| --- | --- |
| 100 | CHEMIGUM ® NX 775 |
| 40 | VULKASIL ® C, a highly reactive silica from Bayer AG, D-5090 Leverkusen |
| 0.5 | EDMA (ethylene glycol dimethacrylate) from Degussa, D-6450 Hanau |
| 1.0 | Stearic acid |
| 3.0 | PERKADOX ® 40 (peroxide) from Akzo-Chemie, Netherlands |

2.6 Composite panels with rubber

To demonstrate the bonding action, composite panels are prepared by covering the panels produced in 1.4 to the extent of one-third with a Teflon film, placing a rubber hide of suitable dimensions on the panel, preparing the composite by pressing and finally sawing off test pieces having a width of 25 mm. These test pieces are subjected to a peel test in accordance with DIN 53 539.

Result

The following properties are determined from Example 2:

| Unvulcanized rubber | Vulcanizing temperature in °C. | Vulcanizing time in min | Bond strength in N/mm DIN 53 539 | Type of separation c = cohesive a = adhesive |
| --- | --- | --- | --- | --- |
| 2.5 | 170 | 10 | 12.7 | c |

The separation in the peel test (DIN 53 539) occurs cohesively, i.e. the composite separates within the rubber component and not at the plastic/rubber interface.

Furthermore, it is noted that although the rubber composition o molded material B contains about 100 parts by weight of a rubber having carboxyl or anhydride functional groups; about 10 to 300 parts by weight of fillers; and about 1 to 10 parts by weight of peroxidic vulcanizing agents, the rubber composition may also contain from 0 to 4 parts by weight of vulcanization activators, from 0 to 150 parts by weight of plasticizer; and optionally further additives which are known by customary use.

Having described the present invention, it will be apparent to one of ordinary skill in the art that many changes and modifications can be made to the above described embodiments without departing from the spirit and the scope of the present invention.

WHAT IS CLAIMED AS NEW AND DESIRED TO BE SECURED BY LETTERS PATENT OF THE UNITED STATES IS:

1. Components made from at least two molded materials A and B which are firmly bonded together, and in which
a) the molded material A is composed of a matrix of polyamide or of a polyamide-containing molding composition and of a continuous, non-metallic fibrous reinforcement embedded therein, and
b) the molded material B is the rubber obtained after peroxidic vulcanization of a rubber composition which is applied to A, the rubber composition containing the following components:
   i) about 100 parts by weight of a rubber having carboxyl or anhydride functional groups;
   ii) about 10 to 300 parts by weight of fillers; and
   iii) about 1 to 10 parts by weight of peroxidic vulcanizing agents.

2. The components according to claim 1, wherein the polyamide used is PA 46, PA 6, PA 66, PA 610, PA 612, PA 1010, PA 1012, PA 11, PA 12 or PA 1212 or a mixture thereof.

3. The components according to claim 1, wherein the polyamides contain COOH and $NH_2$ terminal groups in a ratio of 1:x where $100 > x > 1$.

4. The components according to claim 1, wherein the polyamide-containing molding composition contains up to 70% by weight of a polyphenylene ether, relative to the total amount of polyphenylene ether and polyamide.

5. The components according to claim 1, wherein the reinforcements are composed of glass fibers, aramid fibers or carbon fibers or a mixture thereof which are present in the form of yarns, fabrics, mats, webs, UD tapes, laid fabrics, rovings or as individual fibers.

6. The components according to claim 1, wherein the rubber composition contains a carboxyl- or anhydride- containing EP(D)M or NBR rubber.

7. The components according to claim 1, wherein the fillers used int he rubber composition are carbon black, silica, silicates, calcium carbonate, zinc oxide or stearic acid or a mixture thereof.

8. The components according to claim 1, wherein said rubber composition of molded material B further contains from 0 to 4 parts by weight of vulcanization activators.

9. The components according to claim 1, wherein said rubber composition of molded material B further contains from 0 to 150 parts by weight of plasticizer.

10. The components according to claim 9, wherein the plasticizer used is up to 50 parts by weight of naphthenic oils, relative to 100 parts by weight of rubber.

11. A process for the preparation of the components according to claim 1, which comprises completely enclosing said fibrous reinforcements with polyamide or with a polyamide-containing molding composition, applying the rubber composition to the molded material A which has been prepared in this manner and vulcanizing the rubber composition.

12. The process according to claim 11, wherein the vulcanization is carried out at temperatures of between 140° and 200° C. for 3 to 30 minutes.

13. The process according to claim 12 wherein the vulcanization is carried out at temperatures of between 150° and 180° C. for 5 to 15 minutes.

* * * * *